United States Patent
Zimmermann

(10) Patent No.: US 6,433,753 B1
(45) Date of Patent: Aug. 13, 2002

(54) RADOME FOR A RANGE WARNING RADAR

(75) Inventor: Werner Zimmermann, Putzbrunn (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/863,846

(22) Filed: May 23, 2001

(30) Foreign Application Priority Data

May 27, 2000 (DE) .......................................... 100 26 454

(51) Int. Cl.$^7$ .............................. H01Q 1/02; H01Q 1/42
(52) U.S. Cl. ........................ 343/872; 343/704; 219/522
(58) Field of Search .................................. 343/712, 713, 343/704; 219/203, 522; 392/422

(56) References Cited

U.S. PATENT DOCUMENTS

| | | | |
|---|---|---|---|
| 4,419,570 A | * 12/1983 | Kalbskopf et al. | 219/203 |
| 5,293,173 A | * 3/1994 | Kropielnicki et al. | 343/704 |
| 5,877,727 A | * 3/1999 | Saitou et al. | 343/704 |
| 6,184,842 B1 | 2/2001 | Leinweber | 343/872 |

FOREIGN PATENT DOCUMENTS

| | | |
|---|---|---|
| DE | 19644164 A1 | 4/1998 |
| DE | 19819709 A1 | 11/1999 |

OTHER PUBLICATIONS

Patent Abstract of Japan, Patent Application No. 10132921A2, May 22, 1998, related to DE 19644164 A1.

* cited by examiner

*Primary Examiner*—Tan Ho
(74) *Attorney, Agent, or Firm*—Davidson, Davidson & Kappel, LLC

(57) ABSTRACT

A radome having for a RWR in a motor vehicle, upon which layers of snow or ice are prevented from forming. Thin metals layers 3 of the radome exhibit an ohmic resistance, an electric current source 4 for heating the radome injects an electric current into the metal layers 3 which flows laterally through the metal layers 3. The radome is suitable for use in a motor vehicle for visually adapting the radome to its surrounding motor vehicle surface.

9 Claims, 2 Drawing Sheets

RADOME FOR A RANGE WARNING RADAR

BACKGROUND INFORMATION

The present invention is directed to a radome for a range warning radar (RWR) in a motor vehicle, the radome having thin, radar-transparent metal layers deposited on the surface of the radome for visually adapting the radome to its surrounding motor vehicle surface.

It is generally known to cover RWRs with a radome that is integrated in the radiator grill of a motor vehicle, and, by metallically vapor depositing the radome material in a way that does not hinder the radar radiation, to give the observer the visual impression that the radiator grill of the motor vehicle is not interrupted by a radome.

This is accomplished, as is known, by using a partial vapor deposition and by structurally molding the radome material, adapting its form to the radiator grill (German Patent Application No. 198 19 709 A1). What is disadvantageous is the possibility of snow or ice forming on such radome surfaces, and thereby degrading the radar transparency.

A motor-vehicle radar system is also known from German Patent Application No. 196 44 164, in which a dielectric member (radome) is positioned in the ray path of the electromagnetic waves to protect from the influences of weather and to focus the radiation. To detect and remove dirt and coatings of ice, snow, and moisture that become deposited on the radome, the radome has a system of electrically conductive paths. They can be used to heat the radome from the inside of the RWRs.

SUMMARY OF THE INVENTION

An object of the present invention is to devise a radome having a predefined type of construction for a RWR in a motor vehicle, upon which layers of snow or ice are prevented from forming.

The present invention provides a radome for a range warning radar (RWR) in a motor vehicle having thin, radar-transparent metal layers deposited on the surface of the radome for visually adapting the radome to its surrounding motor vehicle surface. The thin metal layers (3) have an ohmic resistance, and an electric current source (4) for heating the radome injects an electric current into the metal layers (3) which flows laterally through the metal layers (3). Adjustable electrical resistors (7) are provided in the electric circuit for injecting current in order to compensate for differences in the ohmic resistances of the metal layers (3) caused by manufacturing.

Preferably, an automatically controlled electric switch (8), which is controlled as a function of the radome temperature, is provided for switching the heat on and off.

The metal layers (3) may be covered with a protective coating, which is radar-transparent and visually transparent, to protect against external corrosive and mechanical damages.

The protective layer may be a scratch-resistant lacquer or an SiO2 layer.

In accordance with the present invention, electrically heating the radome prevents the formation of snow or ice layers. The radome is heated by way of the vapor-deposited, decorative metals layers, which exhibit an ohmic resistance and, in response to an electric current being conducted through laterally, heat up and, thus, act as electric heating conductors.

The approach suggested by the present invention makes it possible to prevent snow or ice from degrading RWR functioning. The outer appearance of a radome in accordance with the present invention can be adapted, as needed, to its ambient environment, so that it is excellently suited for installation in a motor vehicle surface with its special design requirements.

BRIEF DESCRIPTION OF THE DRAWINGS

An exemplary embodiment of the present invention is elucidated in the following on the basis of the drawings, in which.

DETAILED DESCRIPTION

Figure 1:
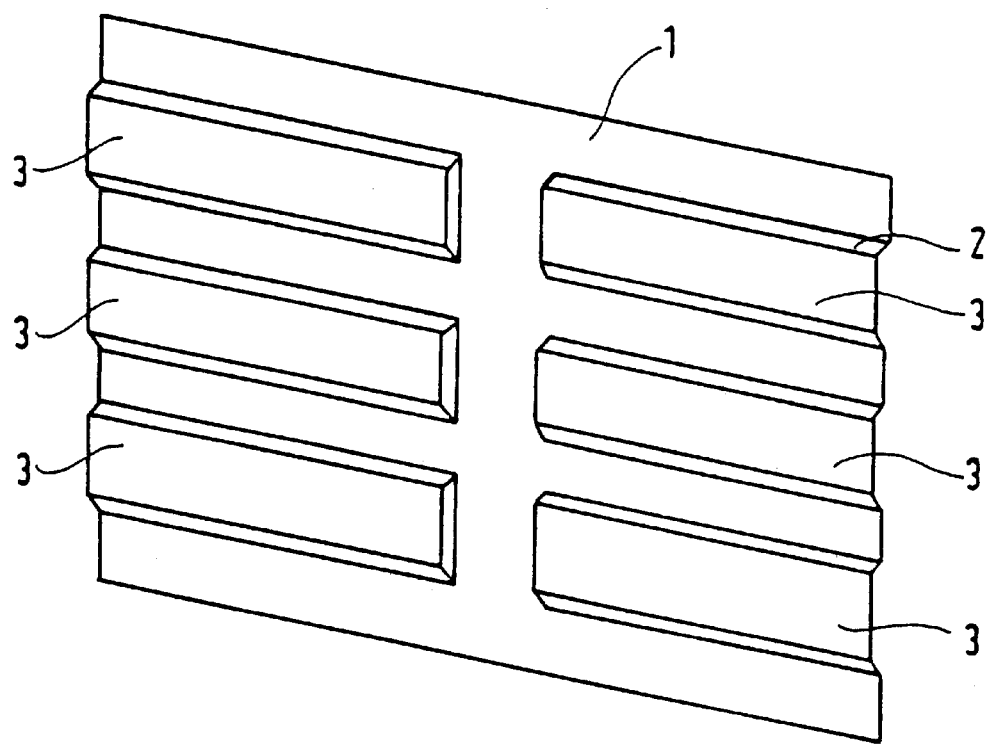
FIG. 1 shows a radome in accordance with the present invention.

The radome shown in FIG. 1 is integrated in a radiator grill of a motor vehicle. To simplify the drawing, the radiator grill itself is not shown in FIG. 1. The radome is made of a radar-transparent supporting plate 1 having low dielectric losses, for example of polycarbonate. The supporting plate has formed struts 2, which are partially vapor-deposited with a thin metal layer 3—made, for example, of chromium or indium.

From a visual perspective, the metallically vapor-deposited struts 2 form a continuation of the metallic struts of the radiator grill. The distinction between the actual metal struts of the radiator grill and the vapor-deposited polycarbonate struts of the radome is not readily discernible to an observer of the radiator grill. Depending on the environment in which radome 1 is integrated, other adapted structures can be formed in radome 1 in place of struts 2. Even a smooth radome surface can be provided. Departing from the design shown in FIG. 1, thin metal layers 3 covering the radome surface can likewise be adapted to the ambient environment, an important consideration being that a suitable arrangement of contact points be provided for electric leads 5 on the metal layers to permit a lateral, electric current flow through metal layers 3.

The image-forming properties of the radome with respect to radar are not significantly affected by thin metal layer 3 on struts 2 since, due to its small thickness, metal layer 3 allows the longer wavelength radar waves to pass through virtually unattenuated, but completely reflects the short-wave, visible light. Moreover, it is known that, as compared to a solid metal body, thin metal layers exhibit an increased ohmic resistance, which is utilized to achieve the objective in accordance with the present invention.

A suitable thickness for thin metal layer 3 that satisfies the optical, technical radar and ohmic requirements can be determined experimentally for various metallic materials; a diagram of sputter-deposited chromium coatings on polycarbonate is provided in the related art mentioned at the outset. In place of chromium, other metals can be used, such as aluminum—or metal compounds for metal layers 3—which, for example, are better adapted to the ambient environment of the radome or which exhibit an advantageous electric layer resistance, as long as the radar transparency is retained in the process. The metals can be vapor deposited, sputtered or imprinted on the radome.

Figure 3:
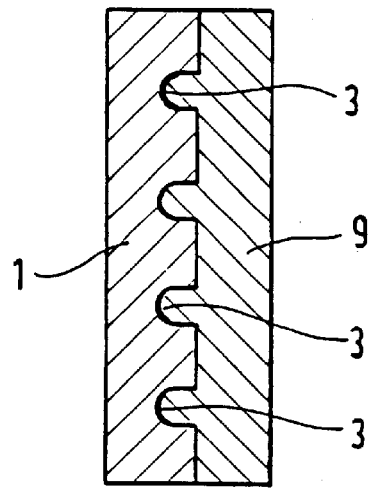
FIG. 3 shows a sectional view of a design variant of the radome in a negative relief.

Deviating from supporting plate 1 described in the preceding, including shaped-out struts 2 in accordance with FIG. 1, as shown in FIG. 3 the radome can also be made, for example, of a supporting plate 1, which has a smooth outer surface and on whose rear side, the radiator grille structure is formed with struts 2 as a negative relief. This negative form is partially vapor deposited with thin metal layers 3, depending on the radiator grill structure, and can be additionally spray-coated from behind with a corrective coating 9—made for example of polycarbonate, which is used to compensate for the scattering and diffraction of the radar beam caused by the negative relief. As described in the preceding, in this specific embodiment, metal layers 3 are used as electric heating conductors for heating the radome.

To protect metal coatings 3 from corrosive and mechanical influences—in accordance with FIG. 1—or the smooth surface of supporting plate 1—in accordance with FIG. 3—the outer radome surface is covered with a thin, radar-transparent and thermally conductive protective layer of, for example, scratch-resistant lacquer. The thermally conductive coating can also be an SiO2 layer, deposited in a CVD process, for example.

In place of a radar-transparent supporting plate 1 described in the preceding, the radome can also be fundamentally made of a multi-layer system of supporting plates or of a deep-drawn foil system having the structure of the radiator grill and masking lacquer layers, which system, on its front side, has the visually discernible metal layers 3.

Figure 2:
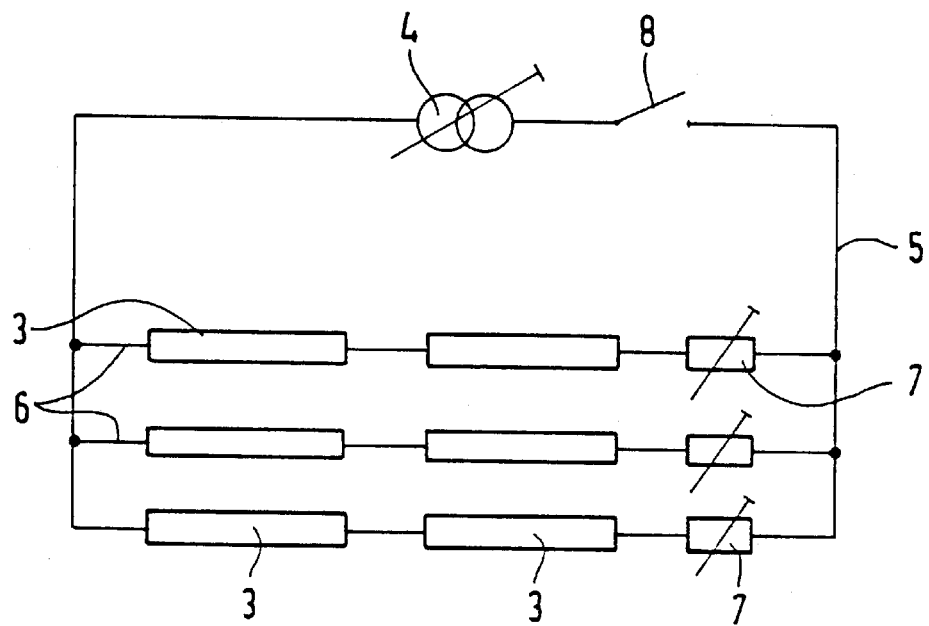
FIG. 2 shows an electric circuit diagram for heating the radome.

As illustrated in FIG. 2, the radome is heated by an adjustable, electric current source 4, which injects an electric current into metal layers 3 of struts 2. For this, metal layers 3 are contacted by electric leads 5. The contacting is achieved by soldered or welded connections known from thin-film technology.

The current is injected, for example, in an electric parallel circuit. A plurality of metal layers 3 can be electrically connected in series in electric parallel circuits 6; in the depicted exemplary embodiment, these are two metal layers.

To compensate for differences in the ohmic resistances of metal layers 3 caused by manufacturing, an adjustable electric resistor 7 can be integrated in the corresponding electric lines 6, as needed. An electric switch 8 is used for switching the radome heating on and off. This switch 8 can also be controlled automatically—e.g., as a function of the radome temperature, for which corresponding known sensor and evaluation devices can be used.

What is claimed is:

1. A radome for a range warning radar in a motor vehicle comprising:

thin, radar-transparent metal layers for visually adapting the radome to a surrounding motor vehicle surface, the thin metal layers having ohmic resistances;

an electric current source for heating the radome providing an electric current to the metal layers, the electric current flowing laterally through the metal layers so as to define an electric circuit; and adjustable electrical resistors provided in the electric circuit to compensate for manufacturing differences in the ohmic resistances of the metal layers.

2. The radome as recited in claim 1 further comprising an automatically-controlled electric switch controlled as a function of a temperature of the radome for switching heat on and off.

3. The radome as recited in claim 2 wherein the metal layers are covered with a radar and visually transparent protective coating to protect against external corrosive and mechanical damages.

4. The radome as recited in claim 3 wherein the protective coating is a scratch-resistant lacquer.

5. The radome as recited in claim 3 wherein the protective coating is an SiO2 layer.

6. The radome as recited in claim 1 wherein the metal layers are covered with a radar and visually transparent protective coating to protect against external corrosive and mechanical damages.

7. The radome as recited in claim 6 wherein the protective coating is a scratch-resistant lacquer.

8. The radome as recited in claim 6 wherein the protective coating is an SiO2 layer.

9. A method of using a radome for a range warning radar in a motor vehicle comprising:

providing thin, radar-transparent metal layers for visually adapting the radome to a surrounding motor vehicle surface, the thin metal layers having ohmic resistances; and heating the radome using an electric current source providing an electric current to the metal layers, the electric current flowing laterally through the metal layers, adjustable electrical resistors being provided in an electric circuit to compensate for manufacturing differences in the ohmic resistances of the metal layers.

* * * * *